April 26, 1938.  A. D. BLUMLEIN  2,115,059
HIGH FREQUENCY ELECTRIC TRANSMISSION LINE
Filed Aug. 7, 1936

INVENTOR
ALLAN DOWER BLUMLEIN
BY
ATTORNEY

Patented Apr. 26, 1938

2,115,059

UNITED STATES PATENT OFFICE 2,115,059

HIGH FREQUENCY ELECTRIC TRANSMISSION LINE

Alan Dower Blumlein, Ealing, London, England, assignor to Electric & Musical Industries Limited, Middlesex, England, a British company Application August 7, 1936, Serial No. 94,725
In Great Britain August 12, 1935

6 Claims. (Cl. 178—44)

The present invention relates to high frequency electric transmission lines, and more particularly to lines which are required to feed a number of loads distributed therealong.

In such systems it is important that the connection of one load across the line shall not disturb adjacent loads. At power frequencies (e. g. 50 cycles per second) this result is obtained by making the impedance of the generator low compared with the impedance of the load and by employing a line of low inductance and resistance. At telephone and radio frequencies, however, efficient operation requires the use of loads of the same order of impedance as the generator and successful working of electrically long feeders requires that they shall be properly matched.

It is an object of the present invention to provide a transmission line which substantially satisfies these requirements.

According to the present invention, there is provided a transmission line comprising a feeder adapted to be fed at one end from a generator having an impedance of the same order of magnitude as the characteristic or surge impedance of the feeder, the feeder being provided with a tapping point at which a tapped load is connected to the feeder and the arrangement being characterized in that there is provided at the tapping point a bridge circuit comprising two tightly-coupled inductive arms and a loading impedance, the arrangement being such that a balance is established between the incoming part of the feeder and the loading impedance, so that the impedance presented and the power supplied to the succeeding feeder is substantially unaffected by the impedance of the tapped load. The feeder may have the same or different characteristic impedances on the two sides of the tapping point and the tapped load may be a signal responsive device or a further feeder or any other desired device.

Figure 1:
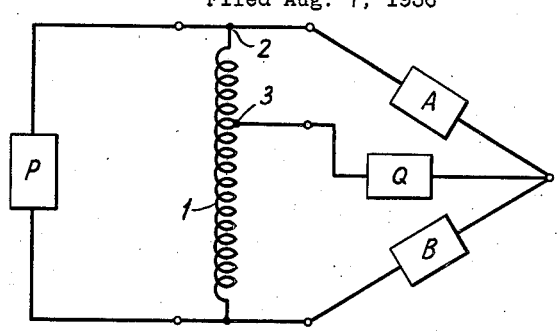
Figure 2:
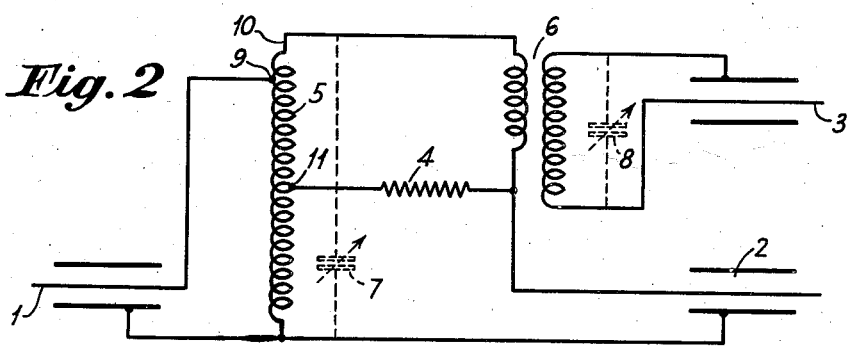
Figure 3:
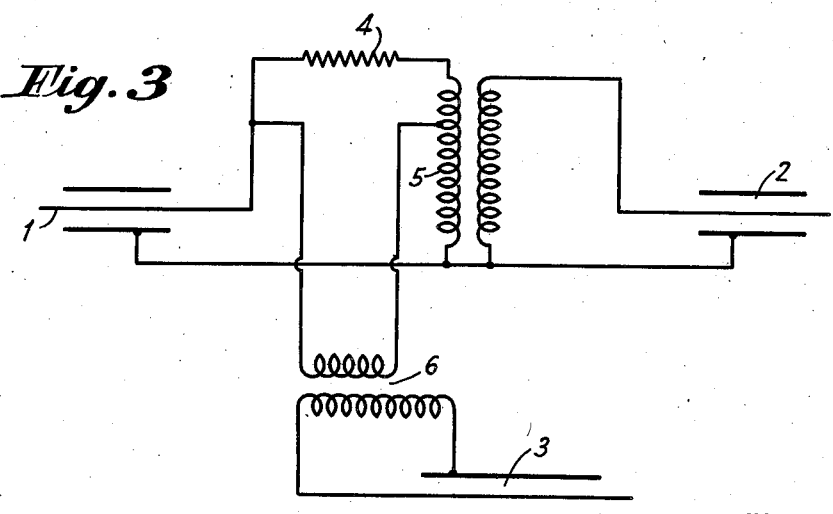

The invention will now be described by way of example with reference to the accompanying drawing, wherein:

Fig. 1 is an explanatory diagram illustrative of the principle of the present invention, and Figs. 2 and 3 show circuits of two embodiments of the present invention.

Referring to Fig. 1, four impedance elements A, B, P, Q, and an auto-transformer I are connected, as shown. The auto-transformer comprises S turns of wire and it is assumed that the inductance is so high and that the coupling between the turns is so tight that it operates as a perfect auto-transformer.

The number of turns in the part of the auto-transformer I between points 2 and 3 is $nS$ where $n$ has a suitable value less than unity. The number of turns between points 3 and 4 is therefore $(1-n)S$. If A, B, P and Q represent the magnitudes of the impedances denoted by these references, and if $(1-n)A=nB$ then there will be no transmission from P to Q. Similarly, if $n(1-n)P=Q$ then there will be no transmission from A to B.

If the former of the above relations is satisfied, then the impedance facing P is equal to $A/n$ which equals $B/(1-n)$ and the impedance facing Q is equal to $(1-n)A$ which equals $nB$. If P is a generator delivering a power $W_p$ watts, then $nW_p$ watts flow to A and $(1-n)W_p$ watts flow to B. If Q is a generator delivering a power $W_q$ watts, then $(1-n)W_q$ watts flow to A and $nW_q$ watts flow to B.

A similar set of relations between impedances and powers may be obtained if the latter of the above relations is satisfied.

Suppose P to be the incoming feeder and Q to be a dead load, then if A is the succeeding feeder going to further tapping points and B is the load tapped at the point under consideration, the impedance facing A and the power delivered to A will be unaffected by the value of B provided that $n(1-n)P=Q$. If P is itself a length of feeder fed from a similar bridge circuit and so on back to a generator connected to one end of the line, it is possible to fix P for all conditions of previous tapped loads and so to fix Q to obtain the balance condition. Similarly A and B can be made the incoming feeder and the loading impedance, and P and Q can be the outgoing circuits. Suitable earthing conditions and impedance values can be obtained by inserting transformers, which transformers for radio frequency work may be tuned. By fixing the value of $n$, the fraction of the power tapped off at any point may be varied, and different values of $n$ may be used at different tapping points. The tapped load may consist of a further length of feeder supplying branched tapping points.

Figs. 2 and 3 show two simple circuits embodying this invention. In both figures an incoming feeder I is coupled to two outgoing feeders 2 and 3 by means of a circuit including a suitable loading impedance 4. In both cases the coupling circuit comprises an auto-transformer 5, and a transformer 6 is provided in the input to feeder 3.

In Fig. 2 it is most convenient to make feeder 3 the connection to the tapped load and feeder 2 the continuation of the incoming feeder I. The condensers 7, 8 shown in dotted lines may be inserted for tuning purposes. Any shunt loss in the auto-transformer 5 may be considered as part of the shunt impedance of the incoming feeder I and may be allowed for in fixing the magnitude of impedance 4. The capacity to earth of the primary winding of transformer 6 may be considered as a part of the tuning capacity 7 across auto-transformer 5. The tapping point on auto-transformer 5 to which impedance 4 is connected is determined by the fraction of the incoming power required by the tapped load. By connecting the feeder 1 to point 9 such that it is across $$\sqrt{1-nS}$$

turns of auto-transformer 5 (the total number of turns being S and the number between points 10 and 11 being $nS$) it is arranged that the impedances looking into feeders 1 and 2 are equal to one another. Similarly by making the turns ratio of transformer 6 equal to $$\sqrt{n}:\sqrt{1-n}$$

the impedance looking into feeder 3 becomes equal to that looking into feeders 1 and 2 so that in this case 3 may be a branch feeder similar to the main feeder.

If the characteristic impedances of the feeders are not all the same, matched conditions can be attained by suitable choice of the position of tapping point 9, of the turns ratio of transformer 6, and of the magnitude of impedance 4.

In the arrangement of Fig. 3, it will be seen that feeders 2 and 3 are both coupled by transformers to feeder 1, the transformers being given such turn ratios that the desired balanced condition obtains.

It must be noted that if the impedances of the tapped load 3 and the outgoing feeder 2 are in suitable ratio (e. g. equal to the impedances feeding them), there will be no transmission from the incoming feeder 1 to the loading impedance 4, and hence no loss of power apart from that necessitated by losses in transformers, etc. Putting it another way, if the impedance of the tapped load seen looking into feeder 3, and the impedance seen looking into the outgoing feeder 2 are in the ratio $$\frac{n}{1-n}$$

to one another, there will be no transmission from the incoming feeder 1 to the impedance 4, and hence no loss of power apart from that due to losses in transformers, etc. When either feeder is fed from a transformer, the impedance in question is, of course, that seen looking into the primary winding of the transformer. Thus in an ideal case with a generator feeding equal available power to $m$ loads, the value of $n$ for each successive tapping point, arranged as in Fig. 2, would be $$\frac{1}{m}, \frac{1}{m-1}, \frac{1}{m-2}$$

and so on, the last but one tapping point having a value of $n$ equal to ½ and the last load being connected directly to the end of the feeder. In practice an allowance must be made for the inevitable losses introduced at each tapping point by the transformers.

Many arrangements, other than those shown in the drawing, are possible.

I claim:

1. An electric transmission system comprising a transmission line coupled at one of its ends to a source of alternating current, and a load coupled to the line at a tapping point therein by means of a bridge circuit, the bridge circuit having two coupled inductive arms and having its remaining arms and its diagonals constituted by said load, an auxiliary impedance, and the parts of the line preceding and following the tapping point, the relative magnitudes of the impedances of the four arms of the bridge circuit being such that, in operation, the current which flows from the source to the part of the line following the tapping point is substantially independent of the magnitude of the current which flows to said load.

2. A transmission system according to claim 1, wherein said source and said auxiliary impedance form the opposite diagonals of said bridge circuit.

3. A transmission system according to claim 1, wherein said load and the part of said line following the tapping point form the opposite diagonals of said bridge circuit.

4. An electric transmission system comprising a transmission line coupled at one of its ends to a source of alternating current, and a load coupled to the line at a tapping point therein by means of a bridge circuit, the bridge circuit having two coupled inductive arms and having its remaining arms and its diagonals constituted by said load, an auxiliary impedance, and the parts of the line preceding and following the tapping point, the relative magnitudes of the impedances of the inductive arms and said diagonals being such that, in operation, the current which flows from the source to the part of the line following the tapping point is substantially independent of the magnitude of the current which flows to said load.

5. An electric transmission system comprising a transmission line coupled at one of its ends to a source of alternating current, and a load coupled to the line at a tapping point therein by means of a bridge circuit, the bridge circuit having two coupled inductive arms and having its remaining arms and its diagonals constituted by said load, an auxiliary impedance, and the parts of the line preceding and following the tapping point, the relative magnitudes of the impedances of the four arms of the bridge circuit being such that, in operation, the current which flows from the source to the part of the line following the tapping point is substantially independent of the magnitude of the current which flows to said load, said source and said auxiliary impedance forming opposite diagonals of said bridge circuit, the effective impedance in said bridge circuit of the load, and of the part of the line following said tapping point being such that, in operation, substantially no power is dissipated in said auxiliary impedance.

6. An electric transmission system comprising a transmission line coupled at one of its ends to a source of alternating current, and a load coupled to the line at a tapping point therein by means of a bridge circuit, the bridge circuit having two coupled inductive arms and having its remaining arms and its diagonals constituted by said load, an auxiliary impedance, and the parts of the line preceding and following the tapping point, the relative magnitudes of the impedances of the four arms of the bridge circuit being such that, in operation, the current which flows from the source to the part of the line following the tapping point is substantially independent of the magnitude of the current which flows to said load, said load and the part of said line following the tapping point forming the opposite diagonals of said bridge circuit, one of said diagonals being coupled into said bridge circuit through a transformer.

ALAN DOWER BLUMLEIN.